(12) United States Patent
Poiesz et al.

(10) Patent No.: US 8,532,924 B2
(45) Date of Patent: Sep. 10, 2013

(54) METHOD AND APPARATUS FOR DISPLAYING THREE-DIMENSIONAL TERRAIN AND ROUTE GUIDANCE

(75) Inventors: Benjamin Poiesz, Santa Clara, CA (US); Maung Han, Arcadia, CA (US)

(73) Assignee: Alpine Electronics, Inc., Tokyo (JP)

( * ) Notice: Subject to any disclaimer, the term of this patent is extended or adjusted under 35 U.S.C. 154(b) by 338 days.

(21) Appl. No.: 12/871,026

(22) Filed: Aug. 30, 2010

(65) Prior Publication Data

US 2011/0054778 A1  Mar. 3, 2011

Related U.S. Application Data

(60) Provisional application No. 61/239,400, filed on Sep. 2, 2009.

(51) Int. Cl.
G01C 21/00 (2006.01)
G08G 1/123 (2006.01)
G09G 5/00 (2006.01)

(52) U.S. Cl.
USPC .............. 701/446; 340/995.11; 345/581

(58) Field of Classification Search
USPC .............. 701/400–541; 340/988–996, 995.1, 340/995.11, 142, 149, 998, 980, 995.2; 348/148, 143; 345/7, 582, 581, 417, 420, 345/412, 441, 586, 647; 382/181, 104
See application file for complete search history.

(56) References Cited

U.S. PATENT DOCUMENTS

| | | | |
|---|---|---|---|
| 6,285,317 B1 | 9/2001 | Ong | |
| 6,611,753 B1 | 8/2003 | Millington | |
| 6,762,772 B1 | 7/2004 | Imamura et al. | |
| 6,871,143 B2 | 3/2005 | Fujiwara | |
| 6,885,939 B2 | 4/2005 | Schmidt et al. | |
| 6,944,537 B2 | 9/2005 | Wiio et al. | |
| 7,002,578 B1 | 2/2006 | Ritter | |
| 7,039,521 B2 | 5/2006 | Hortner | |
| 7,135,961 B1 | 11/2006 | Operowsky et al. | |
| 7,356,408 B2 | 4/2008 | Tsuchiya et al. | |
| 2007/0233380 A1 | 10/2007 | Tanaka | |
| 2008/0074312 A1* | 3/2008 | Cross et al. | 342/25 A |
| 2008/0249703 A1 | 10/2008 | Matsuno et al. | |
| 2009/0171581 A1* | 7/2009 | Ushida et al. | 701/211 |
| 2010/0007669 A1* | 1/2010 | Bethune et al. | 345/520 |

FOREIGN PATENT DOCUMENTS

| | | |
|---|---|---|
| JP | 9212083 | 8/1997 |
| JP | 2003337032 | 11/2003 |

* cited by examiner

*Primary Examiner* — Muhammad Shafi
(74) *Attorney, Agent, or Firm* — Muramatsu & Associates (57) ABSTRACT

An information display device for displaying three-dimensional route and terrain includes a plurality of databases for storing information; a display control unit to dynamically manage the information with different levels-of-detail (LODs); and a user interface communicatively coupled with the control unit to display the managed information with different levels of detail. In one embodiment, the control unit may include a terrain scaling unit to dynamically increase or decrease the height or "3D-ness" of the terrain based on the angle and height of the viewing. The control unit may also include an LOD control unit and a scene stitching unit. In addition, the information display device provides a three-dimensional real-time rendering environment including three-dimensional guidance information which allows the user to understand complex maneuvers without using two-dimensional overlays.

9 Claims, 10 Drawing Sheets

METHOD AND APPARATUS FOR DISPLAYING THREE-DIMENSIONAL TERRAIN AND ROUTE GUIDANCE

CROSS-REFERENCE TO RELATED APPLICATIONS

This application claims priority under 35 USC §119 (e) to U.S. Provisional Patent Application Ser. No. 61/239,400, filed on Sep. 2, 2009, the entire contents of which are hereby incorporated by reference.

FIELD OF THE INVENTION

This invention relates to a display method and apparatus. More particularly, this invention relates to a method and apparatus for displaying three-dimensional route guidance and terrain with dynamic control of different levels-of-detail (LODs).

BACKGROUND OF THE INVENTION

With remarkable advances in computer and semiconductor technologies, electronic devices, such as media players, gaming devices, cellular phones, navigational devices, etc., have become more popular and affordable for most users. In the mean time, there is a prevailing trend for three-dimensional (3D) display in any of those electronic devices to provide the user a better visual enjoyment than traditional two-dimensional (2D) display.

Figure 1:
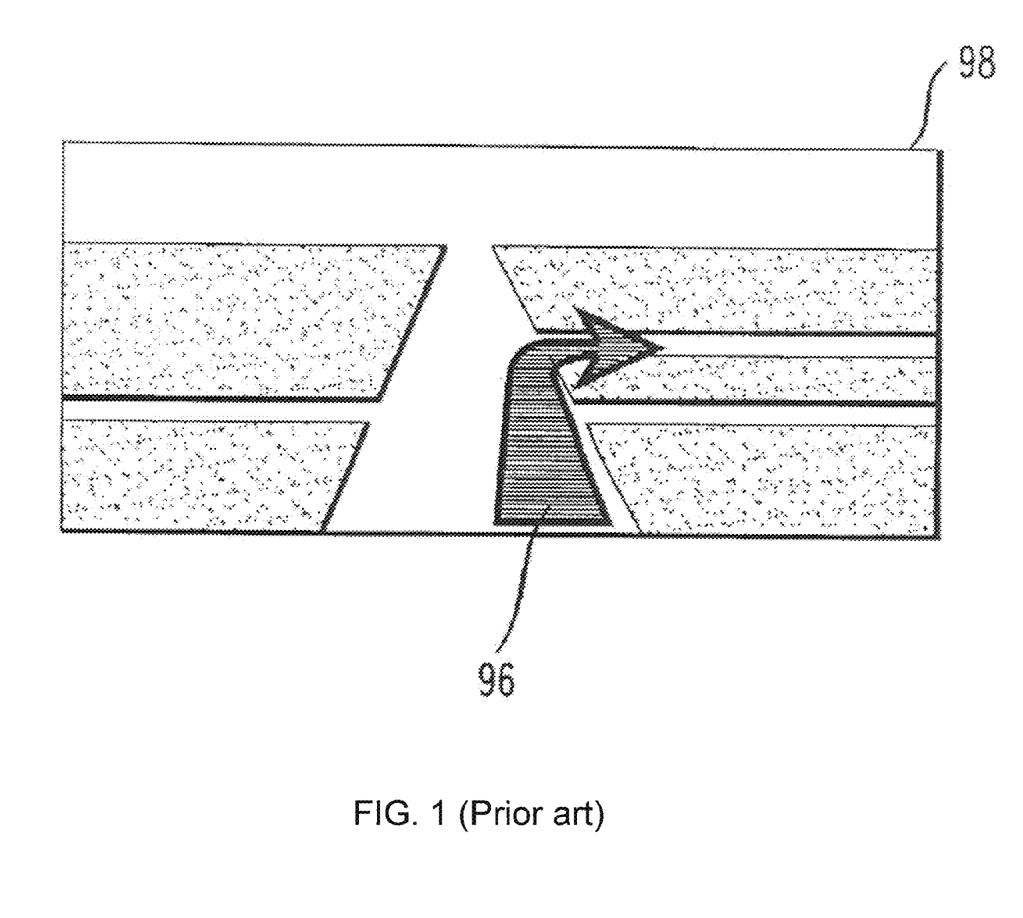
FIG. 1 illustrates a prior art, related to a navigation system for a mobile vehicle which incorporates a real environmental scene overlaid with a three-dimensional turn icon.

In some navigational devices with so-called "three-dimensional" display, there is typically a two-dimensional overlay showing turns or maneuvers in a static, but detailed image. Such an approach requires the user to translate this two-dimensional view into the three-dimensional reality which they see through the windshield. This may cause confusion in routing situations where turns are closely spaced together with roads which are not part of the guidance route. For example, U.S. Pat. No. 6,285,317 to Ong discloses a navigation system for a mobile vehicle which incorporates a three-dimensional display updated with information from a wireless service provider. However, the three-dimensional display in Ong is simply a real environmental scene overlaid with a three-dimensional turn icon, as shown in FIG. 1.

Figure 2:
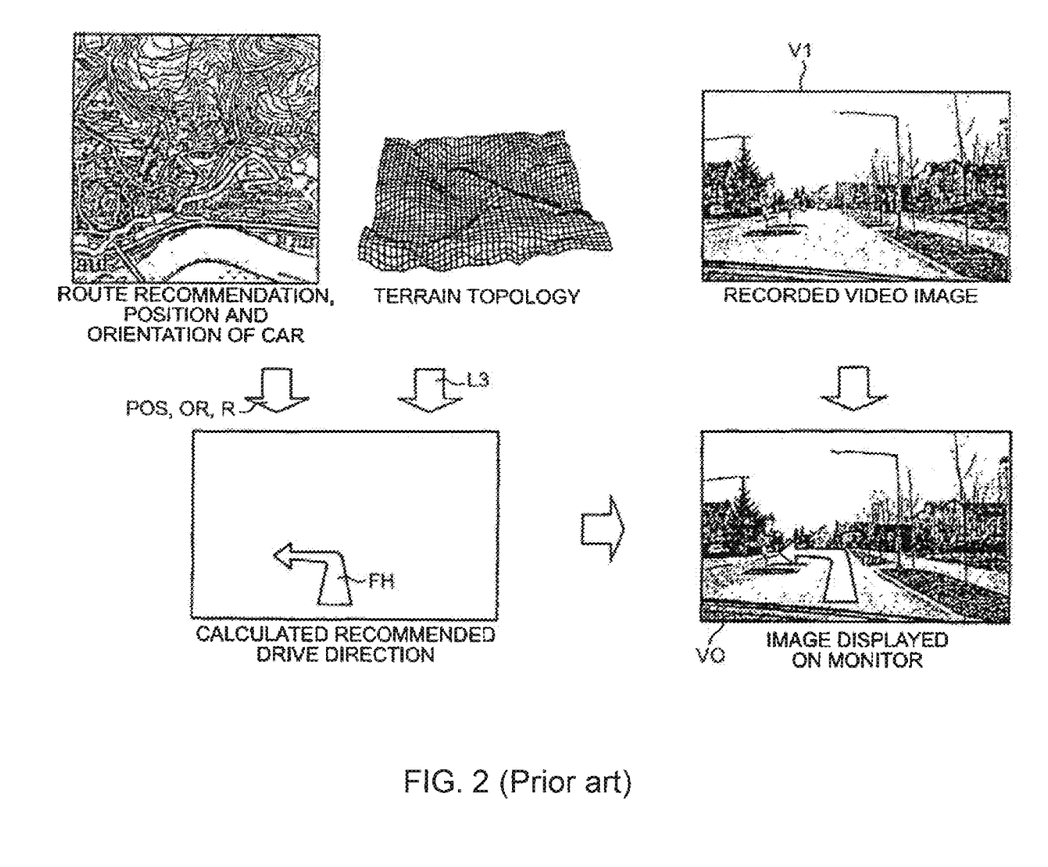
FIG. 2 illustrates a prior art, related to a method and device for displaying three-dimensional driving instructions overlaying on real-time images taken by a camera.

Furthermore, U.S. Pat. No. 7,039,521 to Hortner et al. discloses a method and device for displaying driving instructions. More particularly, when calculating the perspective view from the viewpoint of the user, the inclination of the vehicle about its longitudinal and lateral axes relative to the road surface is taken into account, as is the incline of the road or the three-dimensionality of the terrain. However, as illustrated in FIG. 2, like Ong, Hortner discloses three-dimensional driving instructions overlaying on real-time images taken by a camera.

Conventionally, displaying road and polygon information over three-dimensional terrain poses difficult challenges. For example, the roads may "dig into" or "fly above" the terrain beneath them. In other words, if a long road segment crosses a hill or valley, it is very likely that the road no longer appears connected to the ground. The road may be under or over the terrain surface, which may cause visual discomfort for the user. One solution is proposed to dynamically generate roads which conform to the terrain below, over different Levels-Of-Detail (LODs). However, showing high level-of-detail terrain and roads requires large amounts of memory and processing capability.

Therefore, there remains a need for a method and apparatus to provide three-dimensional route guidance in a three-dimensional rendering environment with dynamic control of LODs without high computation requirements.

SUMMARY OF THE INVENTION

It is an object of the present invention to draw a high detail road and polygon data over three-dimensional (3D) terrain, without the need for very large and detailed vertices which consume large amounts of memory and processing capability.

It is another object of the present invention to provide a more realistic guidance environment coupled with a high performance three-dimensional map rendering, which increases visibility and understanding of complex guidance maneuvers.

It is another object of the present invention to improve performance when drawing large areas of terrain, while traditional LOD control schemes are not applicable, or require too much memory and processing overhead.

It is still another object of the present invention to increase user visibility when viewing close to the ground and parallel to the ground surface.

It is a further object of the present invention to enable the production of quality three-dimensional rendering while maintaining a high speed map engine (about 30 frames per second).

According to one aspect of the present invention, a terrain and route display device includes at least one database to store and provide geographic information including maps, geographical features and road networks; a display control unit in communication with the database to obtain and dynamically manage the geographic information; and a user interface communicatively coupled with the display control unit to display the managed geographic information. The display control unit is configured to generate a route conforming to a three-dimensional terrain with dynamic control over different levels-of-detail (LODs). In one embodiment, the display control unit may include a terrain scaling unit which is configured to dynamically increase or decrease the height or "3D-ness" of the terrain based on the angle and height of the viewing, thereby providing proper road rendering at all height and angle combinations.

Generally, map information is stored as multiple levels of detail that are typically shown based upon the view point of the user. For example, lower detail levels are shown when the user has a higher view point. In another embodiment, the control unit may include a LOD control unit which is adapted to simultaneously manage two or more levels of detail.

In a further embodiment, the control unit may also include a scene connecting unit which is programmed to connect different LOD scenes together. More specifically, a disconnect portion may exist between the lower and higher detail levels, however, the disconnect portion can be eliminated by adding additional points to the higher detail levels.

In another aspect, a method for displaying three-dimensional route guidance and terrain includes steps of retrieving map data from at least one database; dynamically managing the map data with different levels-of-detail; and displaying the managed map data on a display unit. In one embodiment, the step of dynamically managing the map data with different levels-of-detail includes the step of scaling a terrain to dynamically increase or decrease the height of the terrain based on the angle and height of the viewing.

As mentioned above, map information is stored as multiple levels of detail. In another embodiment, the step of dynamically managing the map data with different levels-of-detail may include the step of controlling two or more levels-of-detail simultaneously. In still another embodiment, the step of dynamically managing the map data with different levels-of-detail may also include the step of stitching different LOD scenes together. The step of stitching different LOD scenes together may include the step of adding transition points to the higher detail levels.

In a further embodiment, the step of dynamically managing the map data may include the step of loading the map data at runtime, which includes the steps of loading the map data from the database, loading a plurality of images from at least one terrain database, applying grayscale to the images represented by a plurality of triangle grids, and building more than one road network and using the grayscale images to find heights at road edges so that the road follows contours of the terrain.

In the method of the present invention, the step of applying grayscale to the images represented by a plurality of triangle grids may include the steps of calculating normal for each triangle to determine shading, determining a base shade color according to height and brightness of image points, and multiplying the normal and the base shading color for each triangle to generate shaded terrain color.

The method of the present invention may further include a step of providing a three-dimensional real-time rendering environment including three-dimensional guidance information which allows the user to understand complex maneuvers without using two-dimensional overlays. In the three-dimensional rendering environment, a plurality of three-dimensional signs and turn markers can be placed in the three-dimensional space to indicate proper routes, as they do in the real world.

The present invention together with the above and other advantages may best be understood from the following detailed description of the embodiments of the invention illustrated in the drawings below.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to a display method and apparatus. More specifically, this invention relates to a method and apparatus for displaying three-dimensional route guidance and terrain. With a prevailing trend for three-dimensional display in various electronic devices, such as media players, gaming devices, cellular phones, navigation devices, etc., the demand for high quality three-dimensional display has significantly increased.

Traditionally, displaying road and polygon over three-dimensional terrain poses difficult challenges. For example, as stated above, the roads may "dig into" or "fly above" the terrain beneath them. In other words, if a long road segment crosses a hill or valley, it is very likely that the road no longer appear connected to the ground. The road may be under or over the terrain surface, which may cause visual discomfort for the user. One solution is proposed to dynamically generate roads which conform to the terrain below, over different Levels-Of-Detail (LODs). However, showing high level-of-detail terrain and roads requires large amounts of memory and processing capability. This invention is configured to provide a method and apparatus to display three-dimensional guidance in a three-dimensional rendering environment with dynamic control of LODs without high computation requirements.

Figure 3:
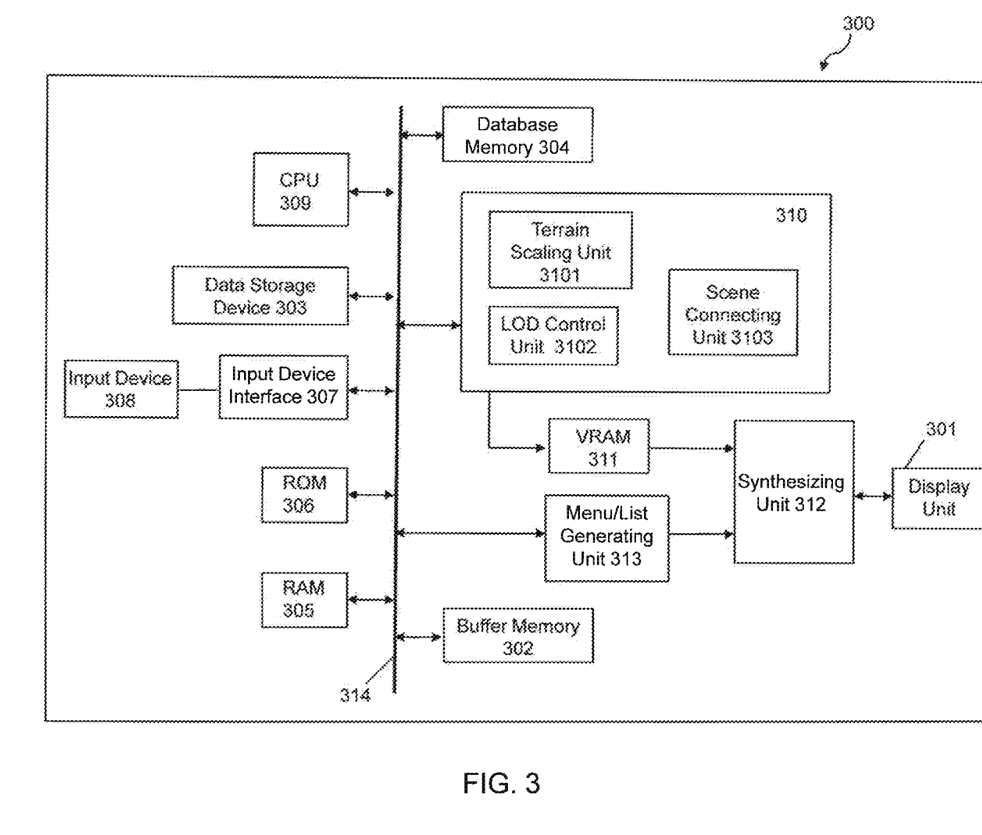
FIG. 3 illustrates a functional block diagram showing an example of structure of an information display unit to display three-dimensional route guidance and terrain.

FIG. 3 is a block diagram illustrating an example of structure of an information display device 300 for implementing the present invention. As can be seen in FIG. 3, the information display device 300 comprises a user interface 301; a buffer memory 302 for temporary storing data for ease of data processing; a data storage device 303; a database memory 304 for storing database information which is read out from the data storage device 303; an input device 308 for executing a menu selection operation, an enlarge/reduce operation, . . . etc., and an input device interface 307.

Still referring to FIG. 3, the information display device 300 includes a processor (CPU) 309 for controlling an overall operation of the device 300; a ROM 306 for storing various control programs; a RAM 305 for storing processed results; a control unit 310 to dynamically manage information to be displayed on the display unit (user interface) 301, such as map information with different levels-of-detail; a VRAM 311 for storing images generated by the control unit 310, a menu/list generating unit 313 for generating menu image/various list images; a synthesizing unit 312 to synthesize and integrate all image information for displaying, and a bus 314 for interfacing the above units/devices in the information display device 300.

Figure 5:
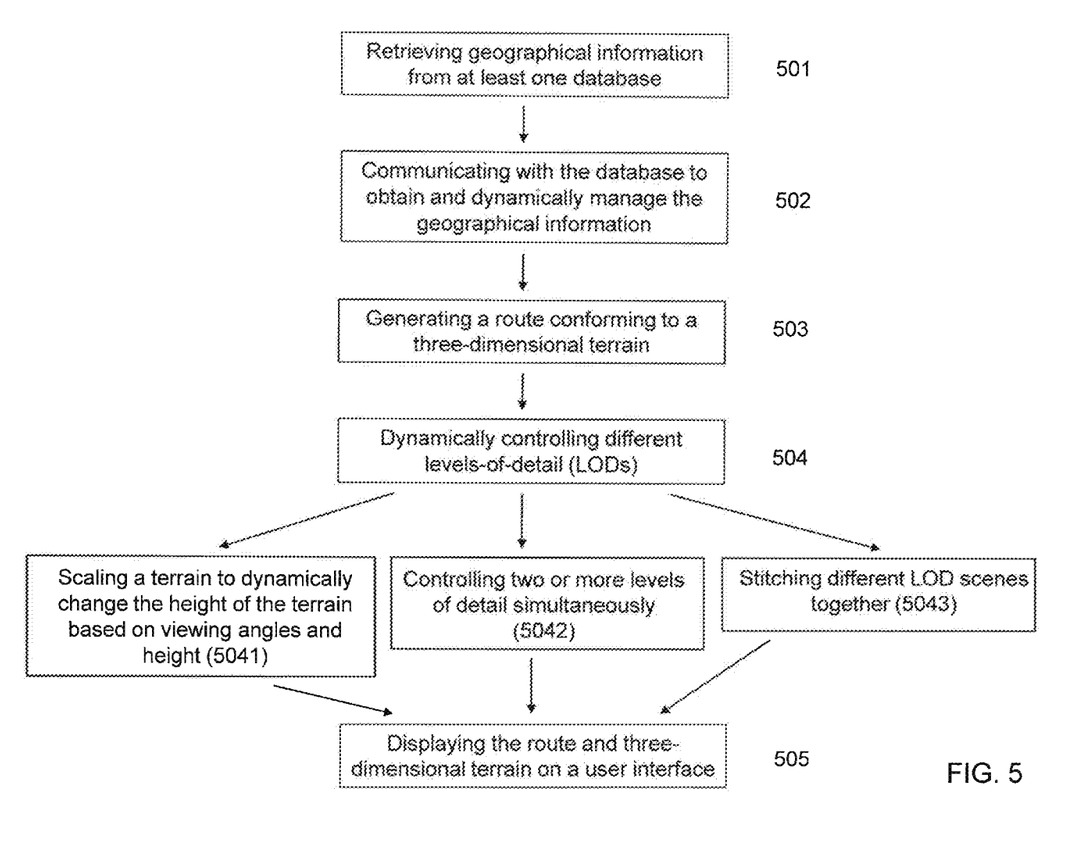
FIG. 5 illustrates a method for displaying three dimensional route guidance and terrain.
Figure 5A:
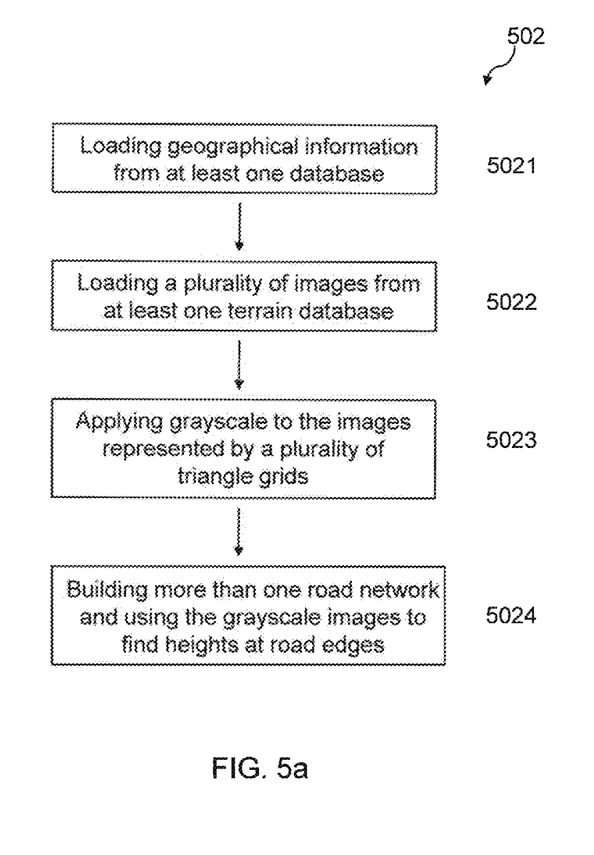
FIG. 5a illustrates one embodiment according to the method for displaying three dimensional route guidance and terrain.
Figure 5B:
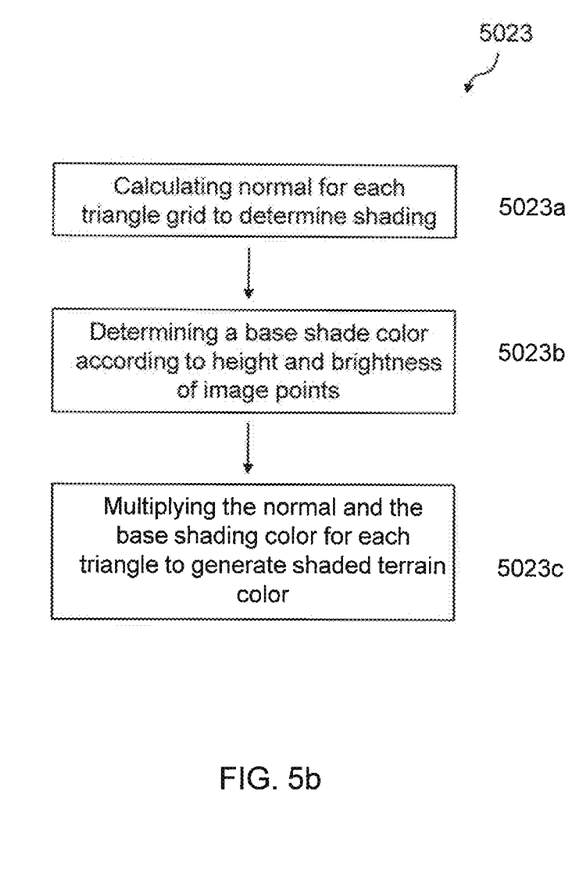
FIG. 5b illustrates another embodiment according to the method for displaying three dimensional route guidance and terrain.

A program for conducting the operation of providing three-dimensional route and terrain in the present invention shown in the flow charts of FIGS. 5 to 5*b* is stored in the ROM 305 or other memory and is executed by the CPU 309. The CPU 309 controls an overall operation of the three-dimensional display in the present invention.

Figure 4:
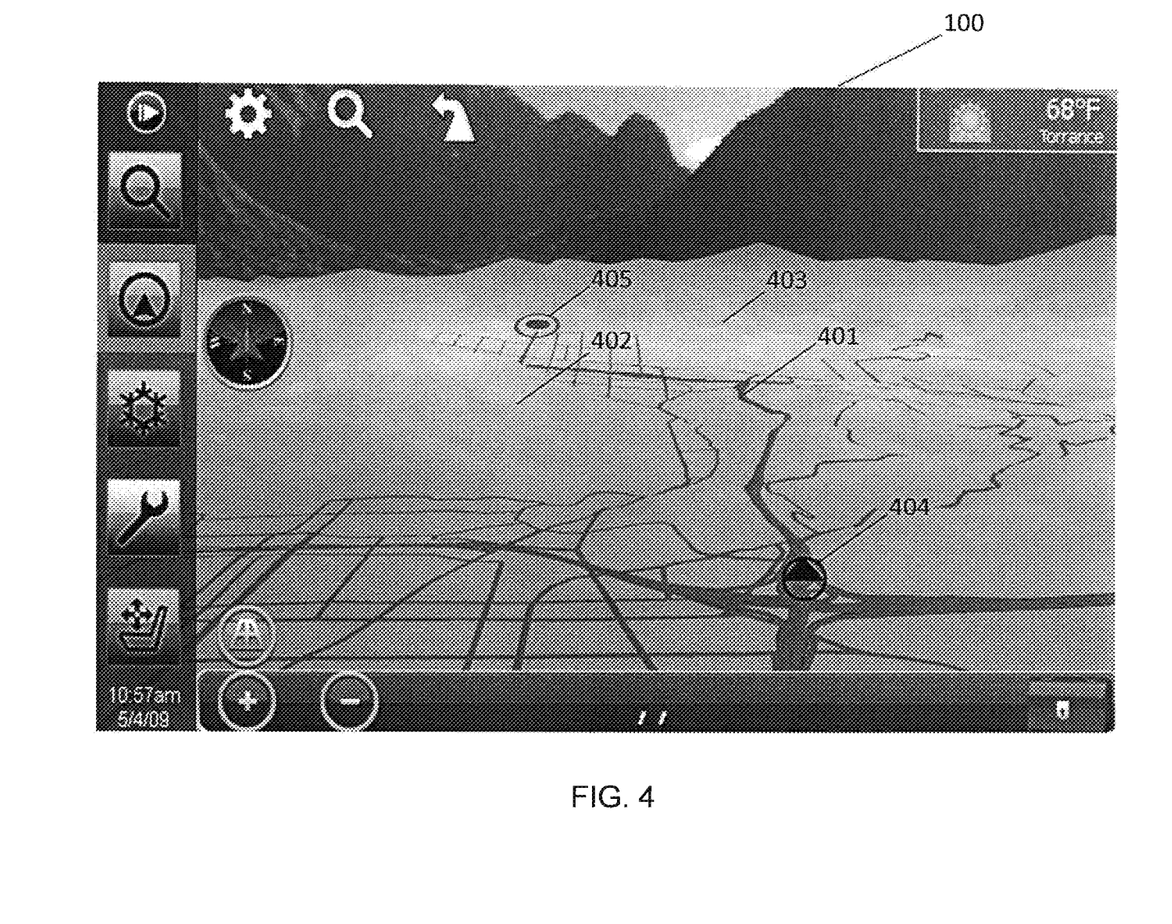
FIGS. 4 and 4a illustrate one embodiment in the present invention in which the height of the terrain can be dynamically changed such that the user can have a clear overview of the road on which he or she is traveling.
Figure 4A:
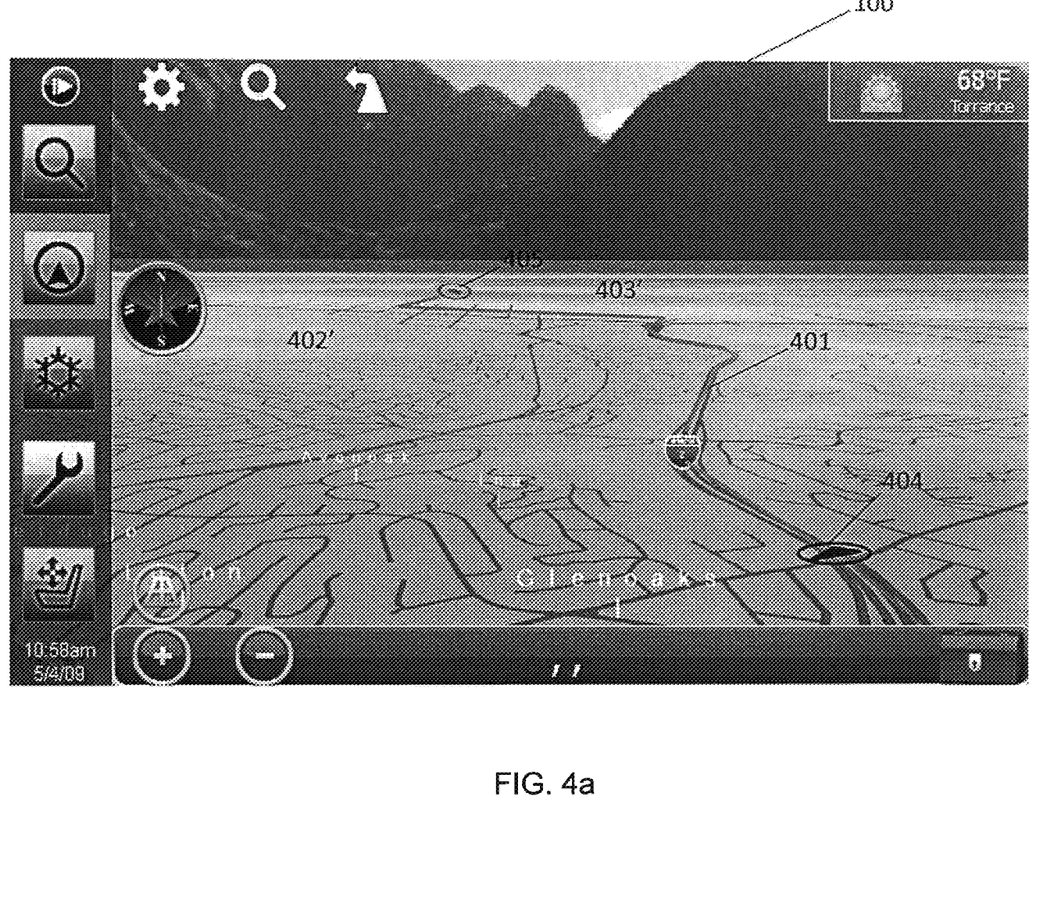

In one embodiment, the control unit 310 may include a terrain scaling unit 3101 which is configured to dynamically increase or decrease the height or "3D-ness" of the terrain based on the angle and height of the viewing, providing proper road rendering at all height and angle combinations. For example, as can be seen in FIG. 4, if the user's current position is 404 and traveling on a route 401 to a destination 405, his or her view of the entire road may be blocked by hilly terrains 402 and 403. The terrain scaling unit 3101 can dynamically decrease the height of the terrains 402 and 403, such that the user can have a clear overview of the road on which he or she is traveling, as shown in FIG. 4*a*.

In some embodiments, the terrain scaling unit 3101 may apply a "Z scale" to adjust the height of the terrain and roads. Generally, this Z scale goes from the range of 1 to 0.1 for a three-dimension (3D) image, and zero for a two-dimension (2D) image.

Still referring to FIG. 4, the terrains 402 and 403 are defined by a plurality of triangle grids (as stated above) with different colors to represent the height of each portion of the terrain. When the height of the terrains 402 and 403 are decreased, the user can still see different colors on the ground level (402', 403' in FIG. 4*a*), representing the original height of the each portion of the terrains 402 and 403.

Generally, map information is stored as multiple levels-of-detail that are typically shown based upon the view point of the user. For example, lower detail levels are shown when the user has a higher view point. In another embodiment, the control unit 310 may also include a Level-of-Detail (LOD) control unit 3102, which is adapted to simultaneously manage two or more different levels-of-detail, in which a standard level (of detail) will be drawn first, then drawn one level higher than the standard level and so on, if any. This drawing technique generates a much larger viewing area of the terrain when the viewing angle is parallel (close) to the ground surface.

The buffer memory 302 is adapted to record every point of the standard level and the higher level(s) drawn by the LOD control unit 3102, so that no point drawn in the standard level is overwritten by the higher level. In other words, this technique allows one scene to be drawn on top of the other one(s), but still appears as a single terrain. Transition points may exist between any two levels and those points can be set to match the borders of "mesh blocks" of the database or to be a fixed distance from a camera. The LOD control unit 3102 can further synchronize the data of any two levels, such that the roads and terrain match properly at the transition points. Additional scaling may also be required to match the data from two different levels.

In a further embodiment, the control unit 310 may also include a scene connecting unit 3103 which is programmed to connect different LOD scenes together. When the user's viewing point is closer to the ground surface, the terrain should be flat. At the same viewing point, a scene which is further away from the user, should be drawn with normal height scaling, such that the user is able to see three-dimensional terrain features in a given distance. However, a disconnected portion between the lower and higher detail levels may exist because the former is drawn flat and the latter is three-dimensional. The scene connecting unit 3103 is configured to add transition points to the higher detail level terrain to bridge the gap between the two levels, such that the disconnected portion can be eliminated.

In another aspect according to FIG. 5, a method for displaying three-dimensional route guidance and terrain includes the steps of retrieving geographical information from at least one database 501; communicating with the database to obtain and dynamically manage the geographical information 502; generating a route conforming to a three-dimensional terrain 503; dynamically controlling different levels-of-detail (LODs) 504; and displaying the managed information on a display unit 505. In one embodiment, the geographical information includes maps, geographical features and road networks. In another embodiment, the step of dynamically controlling over different levels-of-detail (LODs) 504 includes the step of scaling a terrain to dynamically change the height of the terrain based on viewing angles and height 5041, as can be seen in FIGS. 4 and 4*a*.

In another embodiment, the step of dynamically controlling over different levels-of-detail (LODs) 504 includes the step of controlling two or more levels of detail simultaneously 5042. In still another embodiment, the step of dynamically controlling over different levels-of-detail (LODs) 504 may also include the step of stitching different LOD scenes together 5043. The step of stitching different LOD scenes together 5043 may include the step of adding transition points to the higher levels-of-detail to bridge the gap between two levels.

In a further embodiment as shown in FIG. 5*a*, the step of communicating with the database to obtain and dynamically manage the geographical information 502 may also include the steps of loading geographical information from at least one database 5021, loading a plurality of images from at least one terrain database 5022, applying grayscale to the images represented by a plurality of triangle grids 5023, and building more than one road network and using grayscale images to find heights at road edges 5024, so that the road follows contours of the terrain, as shown in FIGS. 4 and 4*a*.

In the method of the present invention, the step of applying grayscale to the images represented by a plurality of triangle grids 5023 may include the steps of calculating normal for each triangle to determine shading 5023*a*, determining a base shade color according to height and brightness of image points 5023*b*, and multiplying the normal and the base shading color for each triangle to generate shaded terrain color 5023*c*, as shown in FIG. 5*b*.

Figure 6:
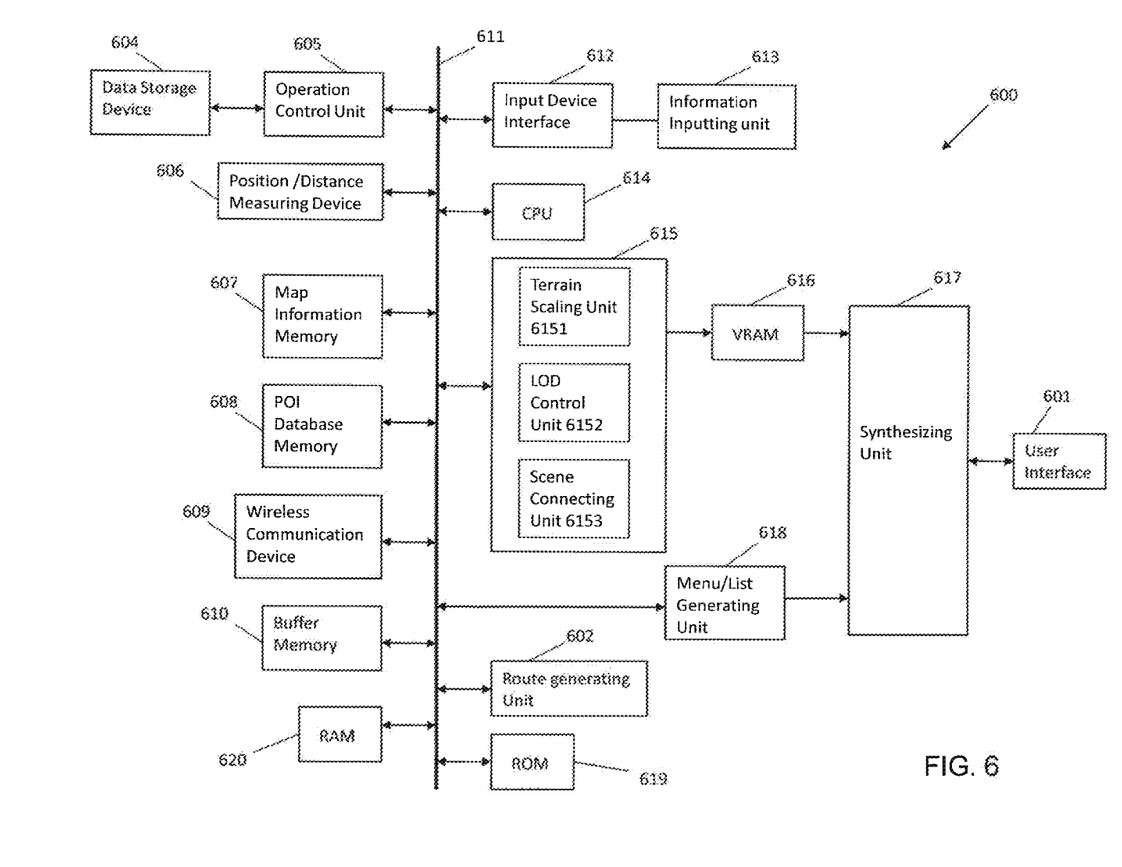
FIG. 6 illustrates a functional block diagram showing an example of structure of a navigation system in the present invention to display three-dimensional route guidance and terrain.

FIG. 6 is a block diagram showing an example of structure of a navigation system 600 for implementing the present invention in another aspect. The navigation system 600 includes a user interface 601 which may include a display unit to display maps, POIs and routing information; a route generating unit 602 and a wireless communication device 609. In another embodiment, the route generating unit 602 is communicatively coupled with the wireless communication device 609 to receive updated map or POI information from a remote server, the Internet or other communication interfaces.

The system also includes a data storage device 604 such as a hard disc, CD-ROM, DVD, a flash memory device or other storage means for storing the map data; an operation control unit 605 for controlling an operation for reading the information from the data storage device 604; and a position and distance measuring device 606 for measuring the present vehicle position or user position. For example, the position and distance measuring device 606 has a GPS (global positioning system) receiver for receiving GPS signals from satellites, a speed sensor for detecting a moving distance, a gyroscope for detecting a moving direction, and a microprocessor for calculating the user's current position using above-mentioned information. In one embodiment, the navigation system 600 may be portable.

The block diagram of FIG. 6 further includes a map information memory 607 for storing the map information which is read from the data storage device 604, a database memory 608 for storing database information such a point of interest (POI) information which is read out from the data storage device 604, an input device 613 for executing a menu selection operation, an enlarge/reduce operation, a destination input operation, . . . etc. and an input device interface 612. In one embodiment, the input device 613 is a remote controller.

Still referring to FIG. 6, the navigation system 600 includes a bus 611 for interfacing the units in the system, a processor (CPU) 614 for controlling an overall operation of the navigation system 600, a ROM 619 for storing various control programs such as a route search program and a map matching program necessary for navigation control, a RAM 620 for storing a processing result such as a route guidance, a display controller 615 for generating map image (a map guide image and an arrow guide image) on the basis of the map information, a VRAM 616 for storing images generated by the display controller 615, a menu/list generating unit 618 for generating menu image/various list images, a synthesizing unit 617, and a buffer memory 610 for temporary storing data for ease of data processing. In one embodiment, the display controller 615 is communicatively coupled with the position and distance measuring device 606 and the map information memory 607 to provide the user a real-time three-dimensional rendering environment. In another embodiment, the map information may be retrieved from an outside database through the wireless communication device 609.

The display controller 615 may include a terrain scaling unit 6151 adapted to dynamically increase or decrease the height or "3D-ness" of the terrain based on the angle and height of the viewing, providing proper road rendering at all height and angle combinations. For example, as can be seen in FIG. 4, if the user is traveling on the route 401 to the destination 405, his or her view of the entire road may be blocked by hilly terrains 402 and 403. The terrain scaling unit 6151 can dynamically decrease the height of the terrains 402 and 403, such that the user can have a clear overview of the route 401 on which he or she is traveling as well as the destination 405, as shown in FIG. 4a.

The display controller 615 may also include a Level-of Detail (LOD) control unit 6152, which is adapted to simultaneously manage two or more different levels of detail, in which a standard level (of detail) will be drawn first, then drawn one level higher than the standard level and so on, if any. This drawing technique generates a much larger viewing area of the terrain when the viewing angle is closer to the ground surface.

The buffer memory 610 is adapted to record every point of the standard level and the higher level(s) drawn by the LOD control unit 6152, so that no point drawn in the standard level is overwritten by the higher level. In other words, this technique allows one scene to be drawn on top of the other one(s), but still appears as a single terrain. Transition points may exist between any two levels and those points can be set to match the borders of "mesh blocks" of the database or to be a fixed distance from a camera. The LOD control unit 6152 can further synchronize the data of any two levels, such that the roads and terrain match properly at the transition points. Additional scaling may also be required to match the data from two different levels.

In a further embodiment, the display controller 615 may also include a scene connecting unit 6153 which is programmed to connect different LOD scenes together. When the user's viewing point is parallel (closer) to the ground surface, the terrain should be flat. At the same viewing point, a scene which is further away from the user, should be drawn with normal height scaling, such that the user is able to see three-dimensional terrain features in a given distance. However, a disconnected portion between the lower and higher detail levels may exist because the former is drawn flat and the latter is three-dimensional. The scene connecting unit 6153 is configured to add additional points to the higher detail level terrain to bridge the gap between the two levels, such that the disconnect portion can be eliminated.

Figure 7:
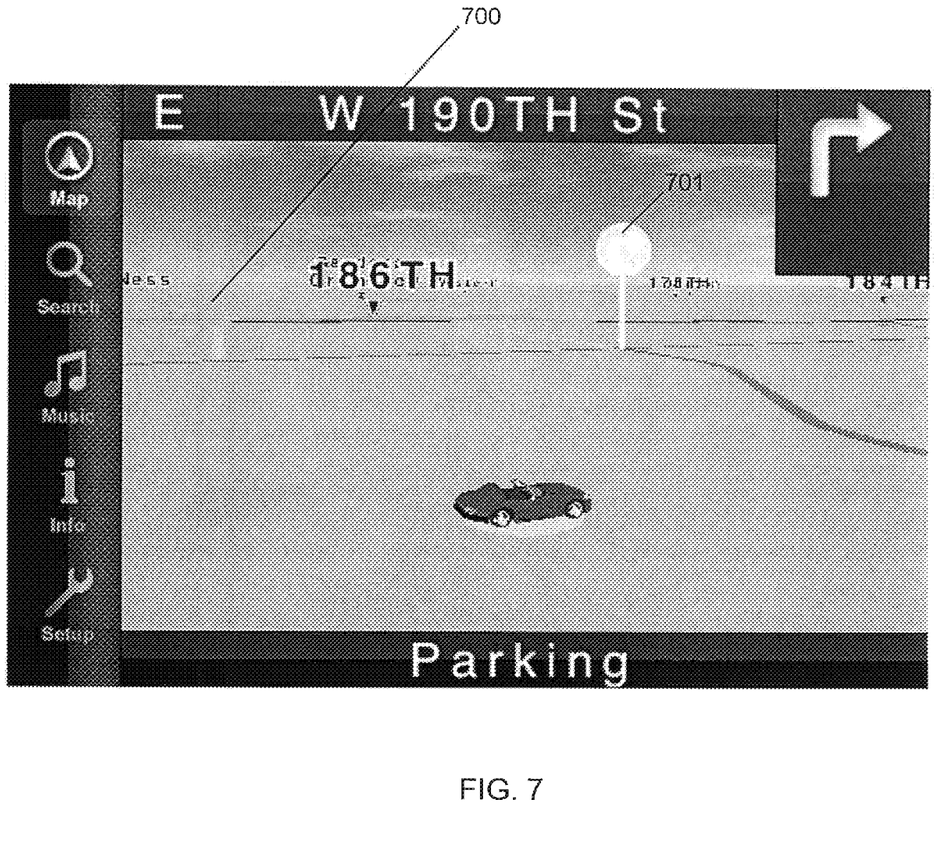
FIG. 7 illustrates one embodiment in the present invention to display a three-dimensional real-time rendering environment including three-dimensional guidance information which allows the user to understand complex maneuvers without using two-dimensional overlays.

Referring to FIG. 7, the navigation system 600 can also provide a three-dimensional real-time rendering environment 700 including three-dimensional guidance information 701 which allows the user to understand complex maneuvers without using two-dimensional overlays. In the three-dimensional rendering environment, a plurality of three-dimensional signs and turn markers can be placed in the three-dimensional space to indicate proper routes, as they do in the real world. In one embodiment, the three-dimensional real-time rendering environment may be incorporated into a smartphone with navigational function.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A method for displaying three-dimensional route guidance and terrain comprising the following steps of:
    retrieving, by using a processor, geographical information from at least one database, the geographical information including maps, geographical features and road networks;
    communicating with the database to obtain and dynamically manage the geographical information;
    generating a route conforming to a three-dimensional terrain by using a display control unit; and
    displaying said route and three-dimensional terrain on a user interface,
    wherein the step of generating a route conforming to a three-dimensional terrain includes a step of dynamically controlling different levels-of-detail (LODs) which comprises the following steps of:
        scaling a terrain to dynamically increase or decrease a height of the terrain based on viewing angles and height;
        simultaneously managing two or more LODs; and stitching scenes with different LODs together by adding transition points in a gap between two different LODs.

2. The method of claim 1, wherein the step of communicating with the database to obtain and dynamically manage the geographical information includes steps of: loading geographical information from at least one database, loading a plurality of images from at least one terrain database, applying grayscale to the images represented by a plurality of triangle grids, and building more than one road network and using grayscale images to find heights at road edges so that the road follows contours of the terrain.

3. The method of claim 2, wherein the step of applying grayscale to the images represented by a plurality of triangle grids includes steps of: calculating normal for each triangle grid to determine shading, determining a base shading color according to height and brightness of image points, and multiplying the normal and the base shading color for each triangle to generate shaded terrain color.

4. The method of claim 1, further comprising a step of providing a three-dimensional real-time rendering environment including three-dimensional guidance information which allows the user to understand complex maneuvers without using two-dimensional overlays.

5. The method of claim 1, wherein the step of simultaneously managing two or more LODs comprising a step of generating a larger viewing area of the three-dimensional terrain when the viewing angle is parallel to a ground surface.

6. A terrain and route display device comprising:
a CPU for retrieving geographical information from at least one database, the geographical information including maps, geographical features and road networks, and for communicating with the database to obtain and dynamically manage the geographical information;
a display control unit for generating a route conforming to a three-dimensional terrain; and
a user interface for displaying said route and three-dimensional terrain on a display;
wherein the display control unit for generating a route conforming to a three-dimensional terrain by dynamically controlling different levels-of-detail (LODs) where the display control unit comprises:
terrain scaling unit for scaling a terrain to dynamically increase or decrease a height of the terrain based on viewing angles and height;
LOD control unit for simultaneously managing two or more LODs; and
scene connecting unit for stitching scenes with different LODs together by adding transition points in a gap between two different LODs.

7. The terrain and route display device of claim 6, wherein the CPU for communicating with the database to obtain and dynamically manage the geographical information further configured to perform operations of: loading geographical information from at least one database, loading a plurality of images from at least one terrain database, applying grayscale to the images represented by a plurality of triangle grids; and building more than one road network and using grayscale images to find heights at road edges, so that the road follows contours of the terrain.

8. The terrain and route display device of claim 7, wherein the operation of the CPU for applying grayscale to the images represented by a plurality of triangle grids includes operations: calculating normal for each triangle grid to determine shading, determining a base shading color according to height and brightness of image points, and multiplying the normal and the base shading color for each triangle to generate shaded terrain color.

9. The terrain and route display device of claim 6, wherein the LOD control unit for simultaneously managing two or more LODs is configured to perform an operation of generating a larger viewing area of the three-dimensional terrain when the viewing angle is parallel to a ground surface.

* * * * *